(12) United States Patent
Anzai et al.

(10) Patent No.: US 6,944,734 B2
(45) Date of Patent: Sep. 13, 2005

(54) STORAGE APPARATUS AND ACCESS CONTROL METHOD

(75) Inventors: Ichiro Anzai, Kawasaki (JP); Ryota Akiyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 882 days.

(21) Appl. No.: 09/736,809

(22) Filed: Dec. 14, 2000

(65) Prior Publication Data

US 2001/0037357 A1 Nov. 1, 2001

(30) Foreign Application Priority Data

Apr. 28, 2000 (JP) ...................................... 2000-131489

(51) Int. Cl.⁷ ............................................. G06F 12/00
(52) U.S. Cl. ..................... 711/163; 711/102; 711/103; 711/164; 713/168; 713/170; 713/182; 713/200; 713/201; 713/202; 386/94; 386/95; 386/97; 386/102; 386/104; 386/106; 380/201; 380/203; 380/227; 380/230; 380/232
(58) Field of Search ................. 711/163–164, 102–103, 711/100, 167, 4; 713/168–171, 182, 200–202, 100; 386/94–95, 97, 102, 104, 106; 380/201, 203, 227, 230, 232

(56) References Cited

U.S. PATENT DOCUMENTS

| | | | |
|---|---|---|---|
| 5,311,498 A | | 5/1994 | Horiguchi |
| 5,440,631 A | | 8/1995 | Akiyama et al. |
| 5,644,444 A | | 7/1997 | Braithwaite et al. |
| 6,249,838 B1 | * | 6/2001 | Kon ........................... 711/103 |
| 6,278,836 B1 | * | 8/2001 | Kawara et al. ................ 386/94 |
| 6,324,537 B1 | * | 11/2001 | Moran ............................ 707/9 |
| 6,526,489 B1 | * | 2/2003 | Kikuchi et al. ............. 711/164 |
| 6,581,160 B1 | * | 6/2003 | Harada et al. ............... 713/169 |
| 6,606,695 B2 | * | 8/2003 | Kamano et al. ............ 711/163 |
| 6,643,085 B2 | * | 11/2003 | Shirai et al. ................... 360/60 |
| 6,684,310 B2 | * | 1/2004 | Anzai et al. ................. 711/164 |
| 6,738,877 B1 | * | 5/2004 | Yamakawa et al. ......... 711/164 |
| 2003/0142822 A1 | * | 7/2003 | Baerlocher et al. |

FOREIGN PATENT DOCUMENTS

| | | | |
|---|---|---|---|
| EP | 0485634 A1 | * 5/1992 | ............. G06F/9/06 |
| JP | 0 301 7860 | 1/1991 | |
| JP | 0 401 7160 | 1/1992 | |
| JP | 0 427 4058 | 9/1992 | |
| JP | 06-068615 | 3/1994 | |
| JP | 08-106735 | 4/1996 | |

OTHER PUBLICATIONS

Adya et al. of Microsoft Research, Redmond, WA 98052, "FARSITE: Federated, Available, and Reliable Storage for an Incompletely trusted Environment", Dec. 2002.*

Chase et al. at University of Washington, "Sharing and Protection in a Single–Address–Space Operating System" which publish in Nov. 1999 via the ACM Transactions of Computer System, vol. 12, No. 4 and pp. 271–307.*

* cited by examiner

*Primary Examiner*—Matthew Kim
*Assistant Examiner*—Zhuo H. Li
(74) *Attorney, Agent, or Firm*—Greer, Burns & Crain, Ltd.

(57) ABSTRACT

A storage apparatus is capable of using a storage medium having at least a first region for storing therein data and a second region for storing therein both use permission discrimination information indicative of permission of a predetermined access operation and use limit information with respect to the storage medium. The storage apparatus comprises a reading unit for reading the use limit information from the second region of the storage medium prior to an access to the storage medium, a collating unit for collating use permission discrimination information provided for a comparison purpose with the use permission discrimination information read out from the second region of the storage medium in the case that the use limit information indicates an "access not-allowed condition", and a writing unit for rewriting the use limit information into such information indicative of an "access allowed condition" when it is confirmed by the collation that the former use permission discrimination information coincides with the latter use permission discrimination information read out from the second region. As a result, an unauthorized use of the storage medium is prevented, improving security.

18 Claims, 7 Drawing Sheets

STORAGE APPARATUS AND ACCESS CONTROL METHOD

BACKGROUND OF THE INVENTION

The present invention generally relates to a storage apparatus for accessing a replaceable storage medium in detachable form to record/reproduce data (information) of the accessed storage medium. More specifically, the present invention is directed to a storage apparatus and an access control method, capable of securing both secrecy and security of data recorded on a storage medium, while limiting use permission (license) and a total number of times of use of this storage medium.

Large capacity storage media such as magneto-optical disks (MO) and optical disks is suitable for storage media for storing therein data protected by copyright, or secret data. The copyright-protected data includes image information, for instance, movies and games, and also includes music information, for example, KARAOKE music. On the other hand, the secret data includes medical information and accounting information.

Such a storage medium is detachably mounted on a storage apparatus. When this type of storage medium is loaded on (inserted in) a storage apparatus having a compatibility, in the case that a user accesses via a superior control apparatus (namely host computer) connected through SCSI (Small Computer System Interface) to this storage apparatus, data can be read (reproduced) and/or written (recorded) from/on this storage medium. As a result, if such a storage medium falls into hands of someone who has a wrongful intent, then the person can readily be involved with unauthorized use, for instance, the person may steal and/or alter copyright-protected data, or secret data recorded on this storage medium.

To avoid such an unauthorized use problem, conventional use permission methods using passwords have been proposed in, for example, Japanese Patent Application Laid-open No. Hei 11-213551. That is, in this use permission method, passwords are recorded in advance on both a storage medium and a storage apparatus, and when the storage medium is mounted on the storage apparatus, this storage apparatus may control an access operation by a user, depending upon a condition as to whether or not an entered password coincides with the recorded password. Also, another conventional method has been proposed to avoid such an unauthorized use problem. It is a method of limiting the number of times used in which one storage medium storing therein the above-described copyright-protected data, or secret data is combined with another storage medium storing therein a number of times of use permission, e.g., a floppy disk.

However, in the case of the former use permission method based on the password system using no other medium than the storage medium, if the password is analyzed and broken, then there is absolutely no way to control such an unauthorized use of stealing or altering the copyright-protected data or the secret data recorded on this storage medium.

Furthermore, in the latter method of limiting the number of times used which employs the separate storage media, not only that legitimate users are given inconveniences of executing such a cumbersome operation, but also that the problem of unauthorized use through decipherment of the storage media can not be solved.

SUMMARY OF THE INVENTION

An object of the present invention is therefore to provide both a storage apparatus and an access control method, capable of preventing an unauthorized use of a storage medium to improve security.

Another object of the present invention is to provide both a storage apparatus and an access control method, with which management of security of a storage medium is simple.

Still another object of the present invention is to provide both a storage apparatus and an access control method, capable of improving user friendliness.

To achieve the above-described objects, there is provided a first storage apparatus, which is a storage apparatus capable of using a storage medium having at least a first region for storing therein data and a second region for storing therein both use permission discrimination information indicative of permission of a predetermined access operation and use limit information with respect to the storage medium, comprising:

a reading unit for reading the use limit information from the second region of the storage medium prior to an access to the storage medium;

a collating unit for collating use permission discrimination information provided for a comparison purpose with the use permission discrimination information read out from the second region of the storage medium in the case that the use limit information indicates an "access not-allowed condition"; and a writing unit for rewriting the use limit information into such information indicative of an "access allowed condition" when it is confirmed by the collation that the former use permission discrimination information coincides with the latter use permission discrimination information read out from the second region.

In this structure of the first storage apparatus according to the present invention, the writing unit rewrites the use limit information into such information indicative of an "access not-allowed condition" when the use of the storage medium is ended.

The use limit information is information used to define a number of times used. In the case that the use limit information indicates an "access allowed condition", the storage apparatus permits a predetermined access to the storage medium. The use permission discrimination information contains such information for discriminating at least one of access allowed conditions of recording and reproducing operations with respect to a predetermined region of the first region.

The storage apparatus is further comprised of an access control unit for permitting an access operation based upon the use permission discrimination information and the use limit information, which correspond to an access instruction of the storage medium in the case that plural sets of use permission discrimination information and use limit information are set to the second region.

Also, there is provided a second storage apparatus according to the present invention, which is a storage apparatus capable of using a storage medium having at least a first region for storing therein data, and a second region for storing therein use permission discrimination information used to permit an access, comprising:

a reading unit for reading the use permission discrimination information from the second region of the storage medium;

a collating unit for collating use permission discrimination information provided for a comparison purpose with the use permission discrimination information read from the second region; and a rewrite control unit for allowing to rewrite use limit number information recorded so as to correspond to the use permission discrimination information when it is confirmed by the collation that the former use permission discrimination information coincides with the latter use permission discrimination information read out from the second region, the use limit number information being used to limit the access to the storage medium.

In this structure of the second storage apparatus according to the present invention, when the use limit number information is invalidated, the rewrite control unit performs such a control that the use limit number information is rewritten into a practically very large value. The use permission discrimination information contains such information for discriminating at least one of access allowed conditions of recording and reproducing operations with respect to a predetermined region of the first region. The storage apparatus is further comprised of an access control unit for permitting an access operation based upon the use permission discrimination information and the use limit number information, which correspond to an access instruction of the storage medium in the case that plural sets of the use permission discrimination information and the use limit number information are set to the second region.

Also, there is provide a first access control method according to the present invention, which is an access control method applicable to such a storage apparatus capable of using a storage medium having at least a first region for storing therein data and a second region for storing therein both use permission discrimination information indicative of permission of a predetermined access operation and use limit information with respect to the storage medium, comprising the steps of:

reading the use limit information from the second region of the storage medium prior to an access to the storage medium;

collating use permission discrimination information provided for a comparison purpose with the use permission discrimination information read out from the second region of the storage medium in the case that the use limit information indicates an "access not-allowed condition"; and rewriting the use limit information into such information indicative of an "access allowed condition" when it is confirmed by the collation that the former use permission discrimination information coincides with the latter use permission discrimination information read out from the second region.

A second access control method according to the present invention is the first method further comprising a step of permitting an access operation based upon the use permission discrimination information and the use limit information, which correspond to an access instruction of the storage medium in the case that plural sets of the use permission discrimination information and the use limit information are set to the second region.

Further, there is provided a third access control method according to the present invention, which is an access control method applicable to such a storage apparatus capable of using a storage medium having at least a first region for storing therein data, and a second region for storing therein use permission discrimination information used to permit an access operation, comprising the steps of:

reading the use permission discrimination information from the second region of the storage medium;

collating use permission discrimination information provided for a comparison purpose with the use permission discrimination information read from the second region; and allowing to rewrite use limit number information recorded so as to correspond to the use permission discrimination information when it is confirmed by the collation that the former use permission discrimination information coincides with the latter use permission discrimination information read out from the second region, the use limit number information being used to limit the access to the storage medium.

A fourth access control method according to the present invention is the third method further comprising a step of permitting an access operation based upon the use permission discrimination information and the use limit number information, which correspond to an access instruction of the storage medium in the case that plural sets of the use permission discrimination information and the use limit number information are set to the second region.

In accordance with the present invention, when use of the storage medium is ended, the use limit information is written into the information indicative of "access not-allowed condition", whereas when the storage medium is to be used, the use limit information is rewritten into "access allowed condition" with reference to the use permission discrimination information. As a result, in the case that a use permission manager does not use the storage medium, namely, a true owner who owns a password that enables the owner to access all the data region of this storage medium does not utilize this storage medium, the access operation is not allowed. Thus, an unauthorized use of such a storage medium can be prevented to improve security of this storage medium.

Also, in accordance with the present invention, the use permission manager (namely, true owner) can put a plurality of access limitations, depending upon licensed users, and also can restrict a total number of times of access. As a consequence, the management of security of the storage medium can be simplified.

Moreover, in accordance with the present invention, a total number of times of use of the storage medium can be changed infinitely. In response to a request of security, a storage medium whose security must be managed can be easily changed into a storage medium whose security is not required to be managed. As a consequence, the user friendliness can be improved.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

Figure 1:
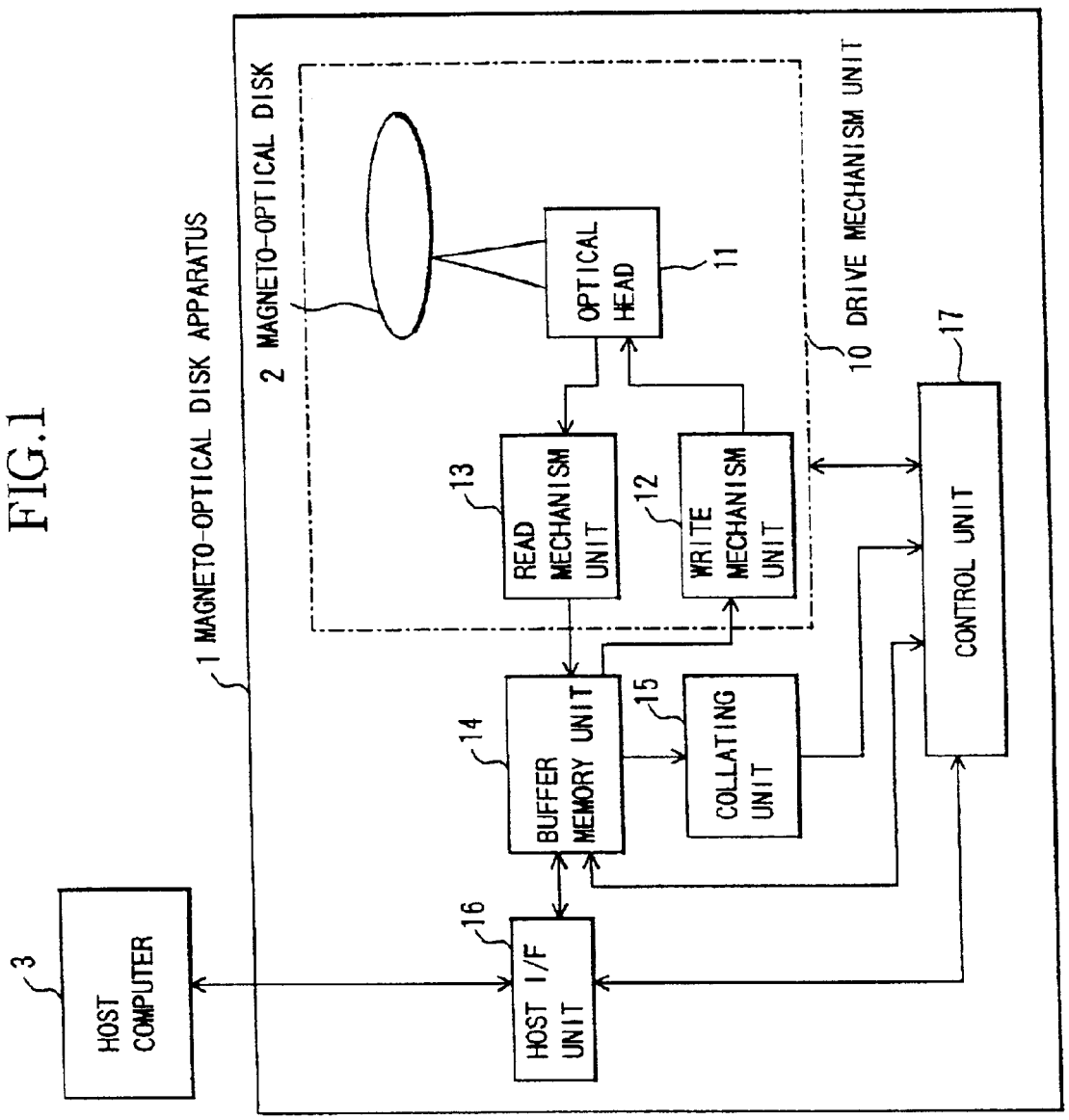
FIG. 1 is a schematic block diagram showing an arrangement of a storage apparatus according to an embodiment of the present invention.

Referring now to the drawings, various preferred embodiments of the present invention will be described in detail.

[Arrangement of Storage Apparatus (Magneto-optical Disk Apparatus)]

FIG. 1 schematically shows an arrangement of a storage apparatus according to an embodiment of the present invention. Referring to FIG. 1, this storage apparatus is realized by a magneto-optical disk apparatus 1. In this magneto-optical disk apparatus 1, a magneto-optical disk (MO) 2 is used as the storage medium. The magneto-optical disk 2 is detachably mounted on a drive mechanism unit (will be explained later in detail) of the magneto-optical disk apparatus 1. Also, the magneto-optical disk apparatus 1 is connected to a host computer 3 functioning as a superior control apparatus (superior controller) by employing an interface known as SCSI (Small Computer System Interface) or ATAPI (AT Attachment Packet Interface). The magneto-optical disk apparatus 1 is controlled based upon the normal command (OS command, namely, command which is supported by operating system) and a specific command (namely, command which is not supported by OS), which are transferred from a host computer 3.

The magneto-optical disk apparatus 1, the magneto-optical disk 2, and the host computer 3 constitute a data processing apparatus. Concretely speaking, such a data processing apparatus may be applied to game machines and KARAOKE music apparatuses.

The host computer 3 is composed of a personal computer and the like. This host computer 3 is provided with an input device such as a keyboard and a mouse (not shown), and an output apparatus such as a display (not shown) in order that general users and use permission managers are accessible to the magneto-optical disk 2. A driver function for driving the magneto-optical disk apparatus 1 is installed in the host computer 3.

The magneto-optical disk apparatus 1 is equipped with a drive mechanism unit 10 to which the rewritable magneto-optical disk 2 is mounted (inserted). The drive mechanism unit 10 contains an optical head 11 which optically accesses to the disk 2, a write mechanism unit 12 which performs a write operation via this optical head 11 on the disk 2, and a read mechanism unit 13 which performs a read operation from the disk 2.

It should be noted that a magnetic field generating unit (not shown in detail) is provided in this drive mechanism unit 10 in such a manner that this magnetic field generating unit is located opposite to the optical head 11. The magnetic field generating unit generates a magnetic field required to write data into the disk 2, or delete data from the disk 2.

Via this optical head 11, copyright data, and secret data are read (reproduced) and/or written (recorded, or stored) as user data from and into the magneto-optical disk 2. The copyright data is provided in the form of image information and music information, whereas the secret data is provided in the form of medical information and accounting information. Furthermore, use permission discrimination information and use limit (use restriction) information are read (reproduced) and/or written (recorded, or stored) as access control data from and into the magneto-optical disk 2.

Also, the magneto-optical disk apparatus 1 is further provided with a buffer memory unit 14, a collating unit 15, a host interface (I/F) unit 16, and a control unit 17. The buffer memory unit 14 is temporarily used in order to read and/or write the above-explained user data and access control data.

The collating unit 15 executes a collating operation with respect to use permission discrimination information which is entered therein via the buffer memory unit 14 as the access control data. The host interface unit 16 enables data (including command) to be transmitted and received between the magneto-optical disk apparatus 1 and the host computer 3. It should be noted that the interface such as SCSI and ATAPI may be applied to this host interface unit 16.

The control unit 17 controls the overall operations of the above-explained units that constitute the magneto-optical disk apparatus 1. Access control software (will be discussed later) is stored in this control unit 17. Also, the control unit 17 owns a function of analyzing a command which is transmitted from the host computer 3 to the host interface unit 16, and a function of controlling a read operation and/or a write operation with respect to the drive mechanism unit 10 in accordance with an analysis result of this command.

[Structure of Storage Medium (Magneto-optical Disk)]

Figure 2:
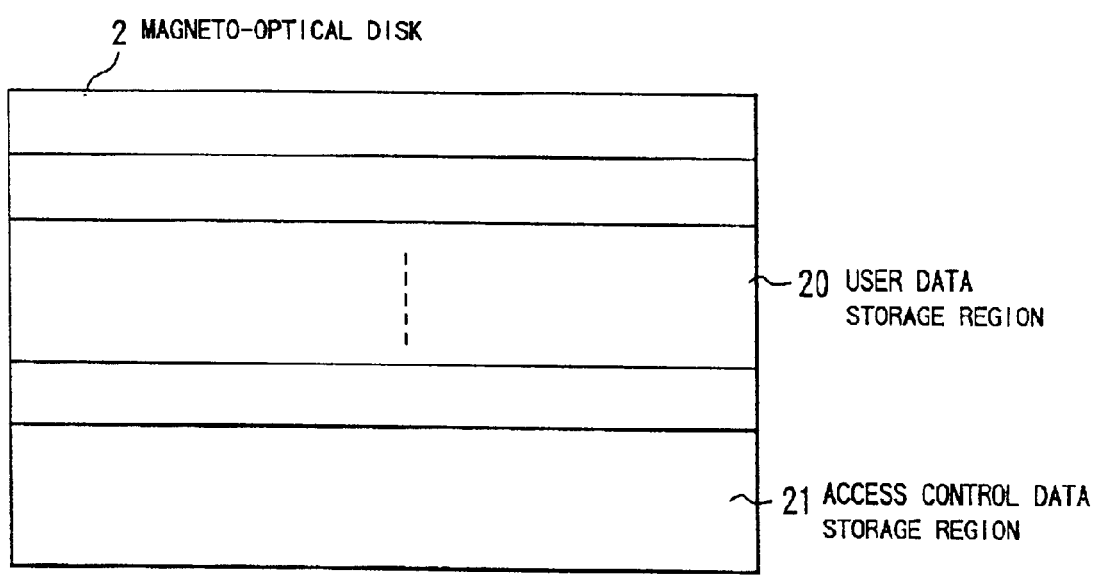
FIG. 2 is an explanatory diagram for explaining a disk format of a magneto-optical disk.
Figure 3:
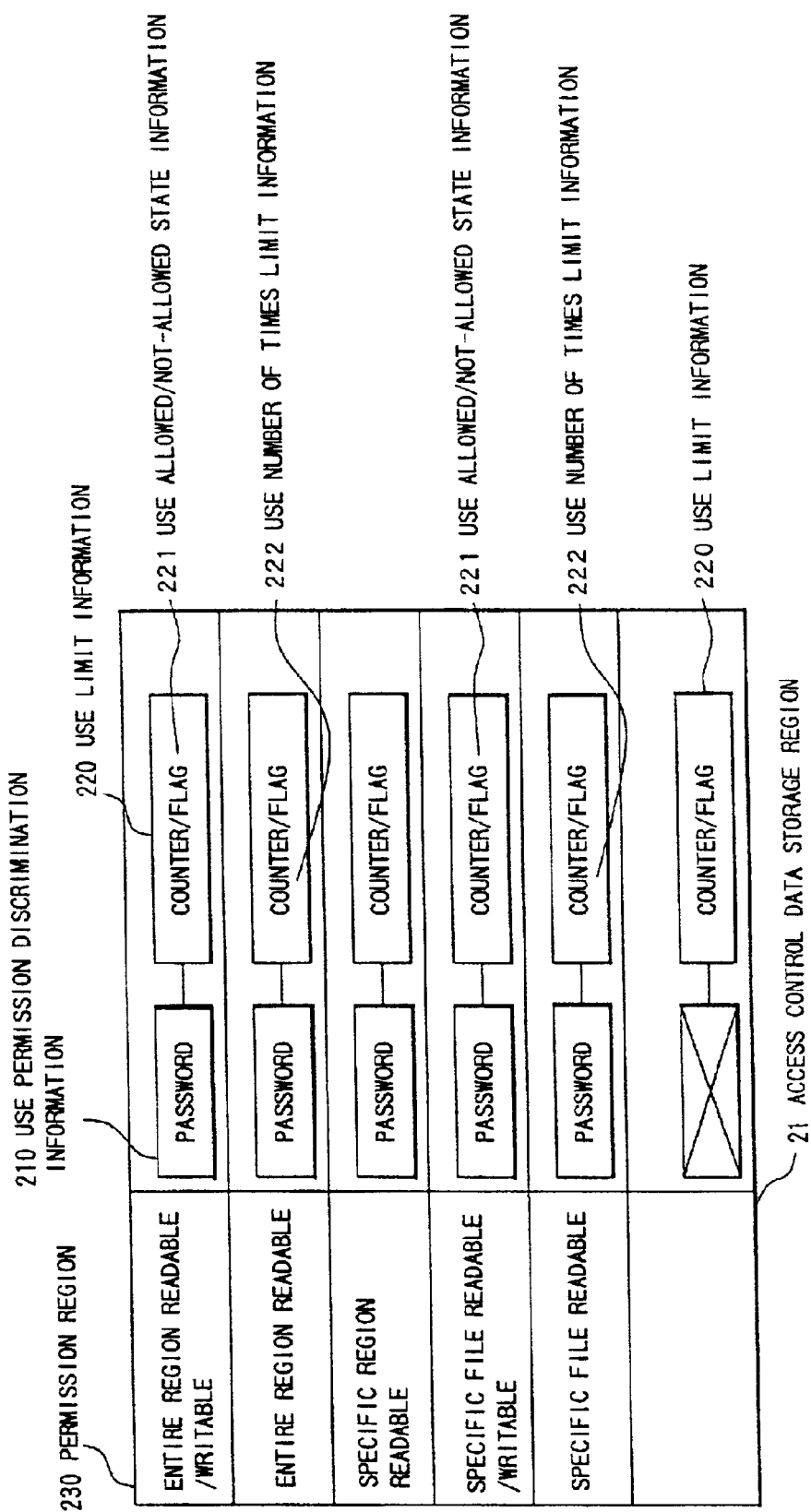
FIG. 3 is an explanatory diagram for explaining an access control data storage area of a magneto-optical disk.

Referring now to FIG. 2 and FIG. 3, the structure of the above-explained magneto-optical disk 2 functioning as the storage medium will be described.

According to the standard (ISO standard) regarding the 3.5-inch magneto-optical disk cartridge, arrange defined from 23.72 mm to 41.00 mm from the center of a ring-shaped magneto-optical disk along a radial direction is defined as a data region into which user data is rewritable. Also, both an inner side and an outer side of this data region along the radial direction are defined as a medium information management region on which various sorts of storage medium information is recorded. The storage medium information is related to a type of a storage medium and the structure thereof. It should be understood that details of a disk format applied to a magneto-optical disk may be referred to the description in the laid-open application mentioned in the above.

As shown in FIG. 2, in this embodiment, the above-described data region defined in the ISO standard is used as a user data storage region 20, and the above-described medium information management region is used as an access control data storage region 21.

As to the user data storage region 20, the magneto-optical disk apparatus 1 may control data recording operation, or data reproducing operation on the basis of the normal command transmitted from the host computer 3 shown in FIG. 1, namely the read/write command which is supported by the OS (operating system) of the host computer 3. As to the access control data storage region 21, the magneto-optical disk apparatus 1 may control data recording operation, or data reproducing operation on the basis of the specific command sent from the host computer 3, namely, the command which is produced by the use permission manager and which is not supported by the above-described OS.

With respect to the user data storage region 20, the copyrighted data such as image information and music information is basically stored as the user data by the use permission manager, or the secret data such as medical information and accounting information is basically stored as the user data in the region by the use permission manager. Also, with respect to the access control data storage region 21, both the use permission discrimination information and the use limit information are stored as the access control data by the use permission manager.

FIG. 3 illustratively shows a detailed structure of this access control data storage region 21. The use permission discrimination information 210 which is stored in the access control data storage region 21 is basically set by a use permission manager, and it is a password which may be updated. Since this use permission discrimination information 210, namely the password is employed, unauthorized access to user data stored in the user data storage region 20 can be prevented.

Also, the use limit information 220 stored in the access control data storage region 21 is either use allowed/not-allowed state information (flag) 221 or use number of times limit information (counter) 222. The use limit information 220 is basically set by a use permission manager, and the access control function of the magneto-optical disk apparatus 1, and also corresponds to data which may be updated. Since this use limit information 220 is employed, unauthorized access to user data stored in the user data storage region 20 can be prevented.

More specifically, the use allowed/not-allowed state information (flag) 221 contained in the use limit information 220 indicates both an accessible state and a not-accessible state to the user data storage region 20 of the magneto-optical disk 2, and may employ, for example, binary data of "1" and "0" in accordance with the respective states. As will be discussed in an access control operation of a storage medium use mode, an important factor is that, when the magneto-optical disk 2 is taken out from the magneto-optical disk apparatus 1 (strictly speaking, at the time of medium use ending process), the use allowed/not-allowed state information 221 is forcibly set to the not-accessible state (namely data of "0").

Also, the use number of times limit information (counter) 222 contained in the use limit information 220 indicates an accessible number of times to the user data storage region 20 formed in the magneto-optical disk 2, and may take multi-value data larger than, or equal to "0". The use number of times limit information 222 that has been set is rewritten at the same storage portion of the access control data storage region 21 in such a manner that a preselected value (e.g., 1) is subtracted from an initial value (e.g., "N=10") of the accessible number of times to the user data storage region 20 of the magneto-optical disk 2 every time access operation is carried out.

It should be understood that at least one set of use permission discrimination information 210 and use limit information 220 may be set to the access control data storage region 21.

[Overall Operation of Storage Apparatus (Magneto-optical Disk Apparatus)]

Figure 4:
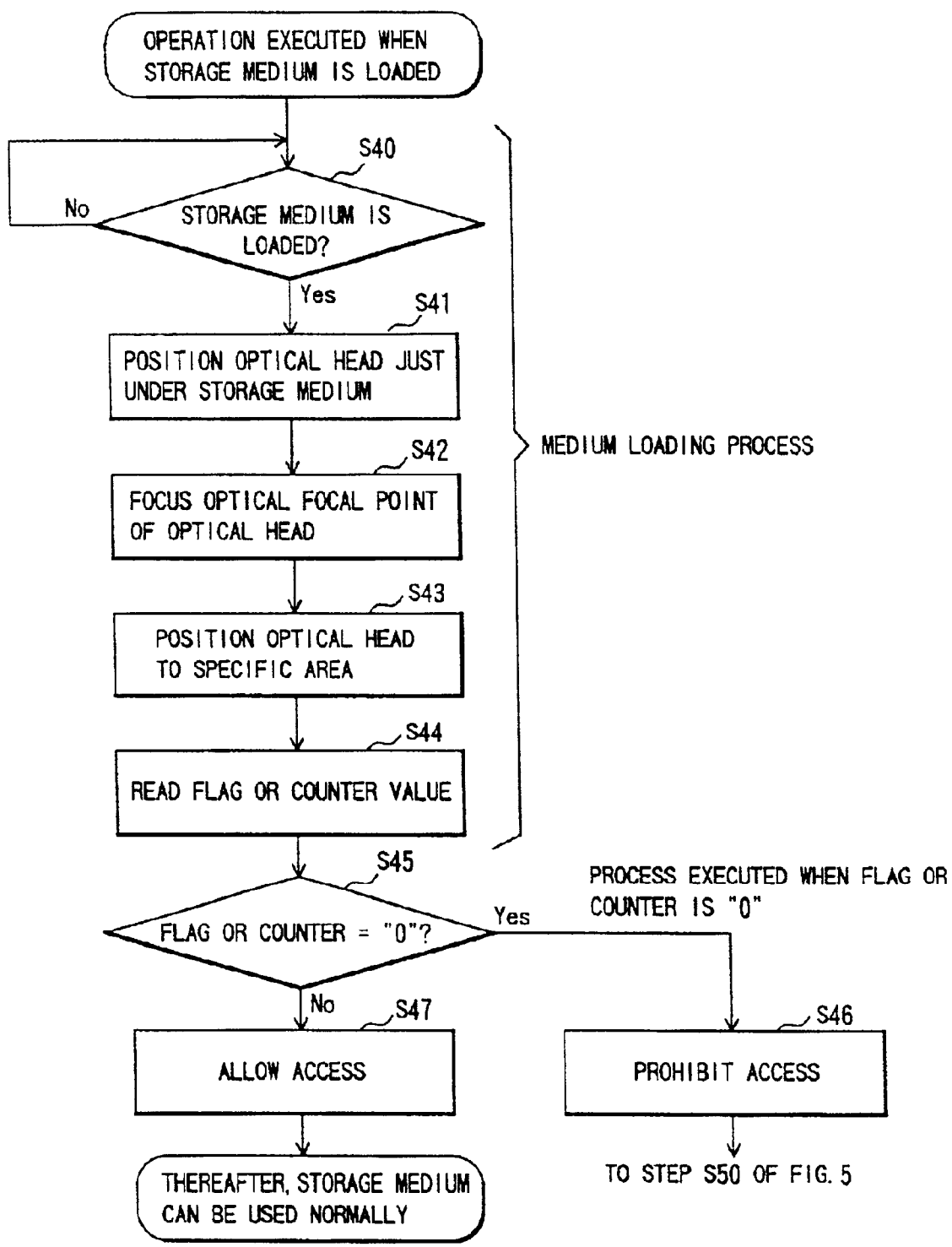
FIG. 4 is a flow chart illustrating operations when a storage medium is mounted on a drive mechanism unit.
Figure 5:
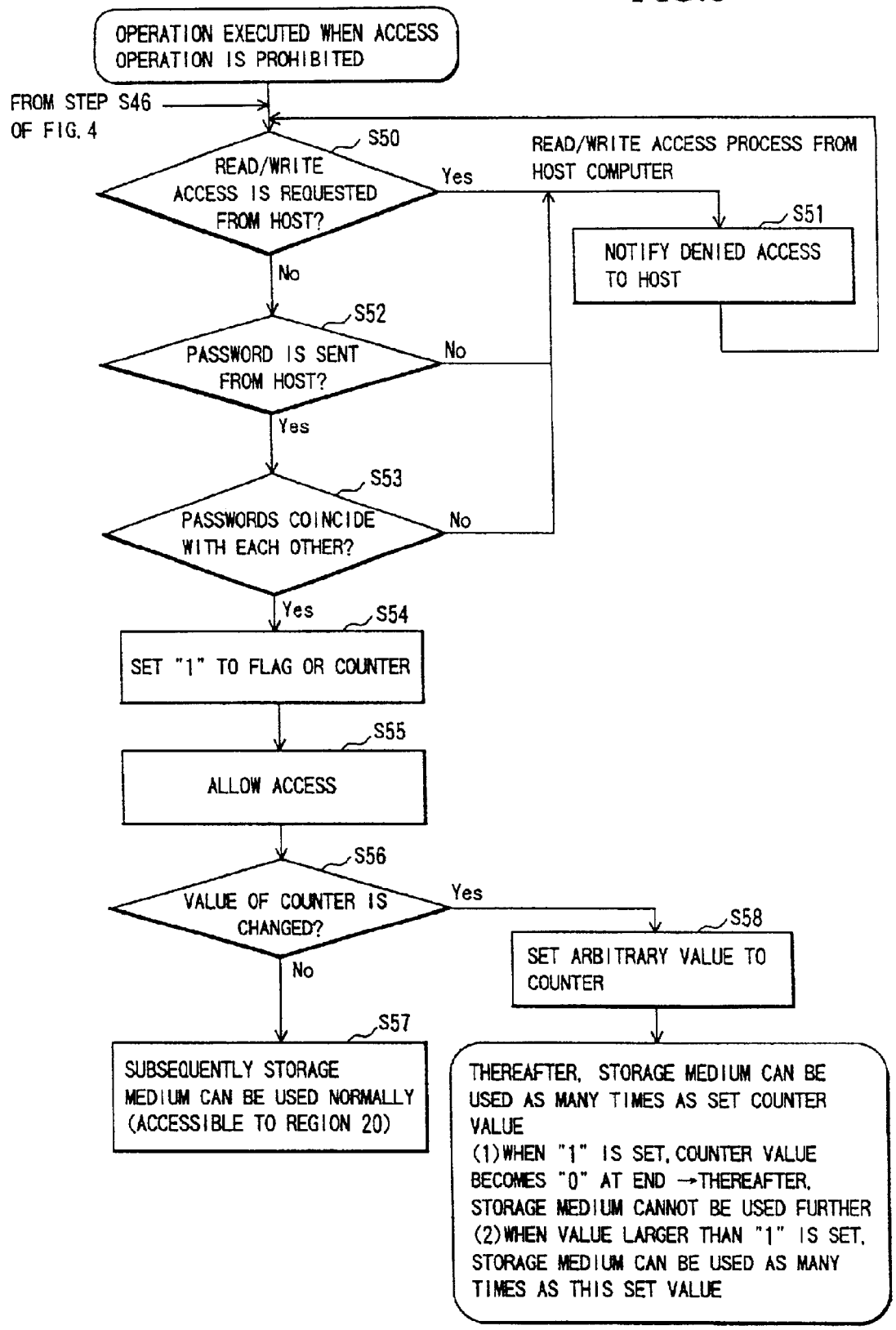
FIG. 5 is a flow chart illustrating operations in the case that an access to a storage medium is prohibited.
Figure 6:
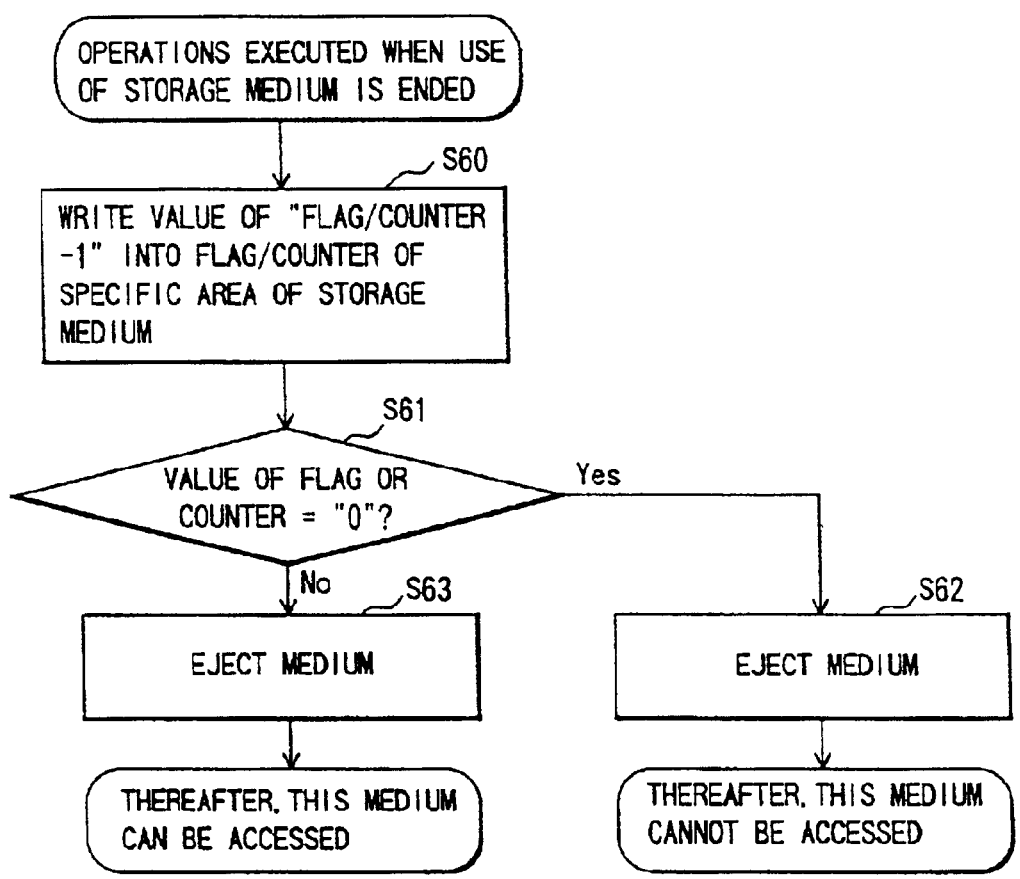
FIG. 6 is a flow chart for explaining operations in the case that the use of the storage medium is ended.
Figure 7:
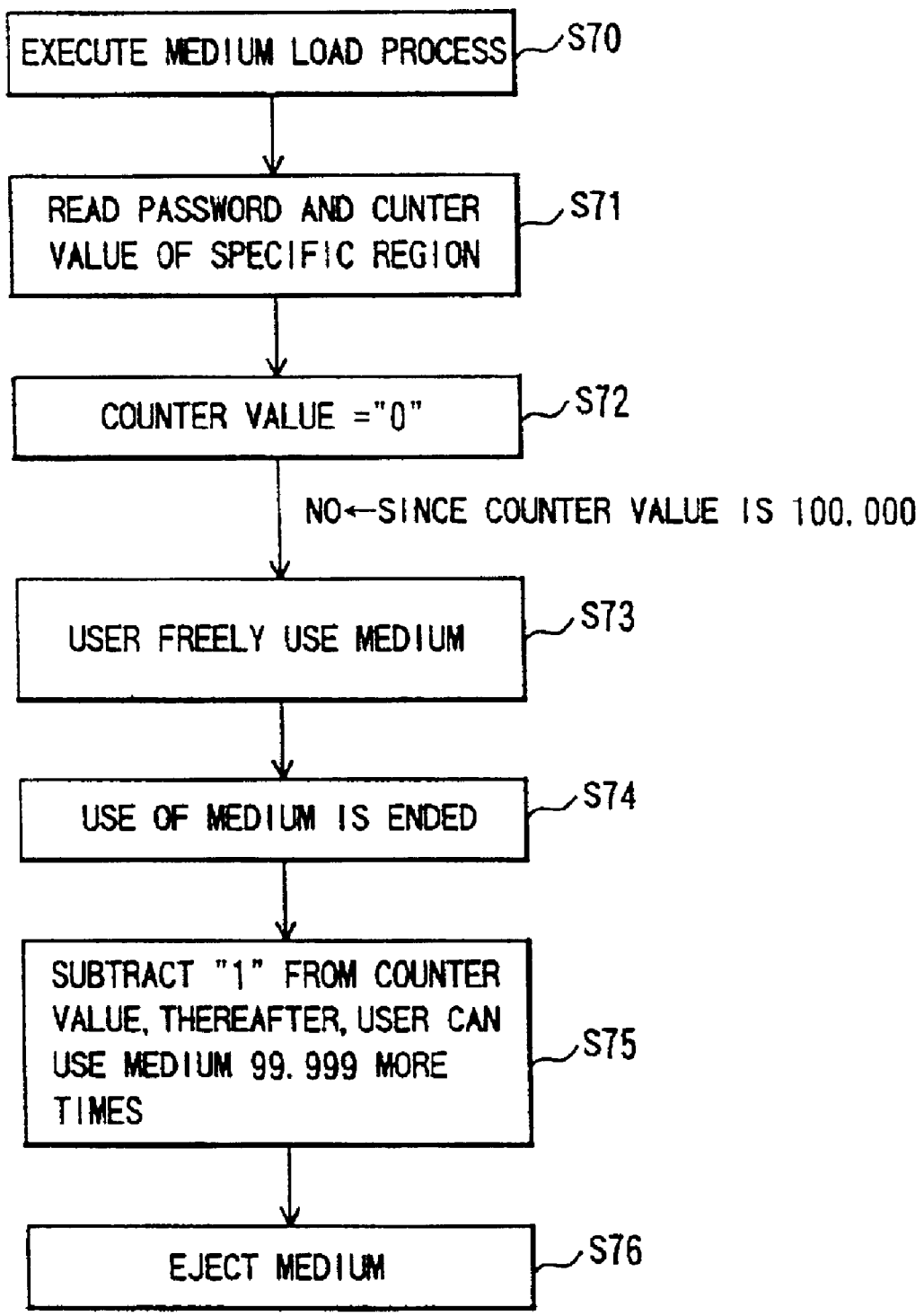
FIG. 7 is a flow chart illustrating operations in the case that a large value is set to use number of times limit information (counter).

Referring now to FIG. 1 to FIG. 7, a description is made of an overall operation of the magneto-optical disk apparatus 1 according to the first embodiment of the present invention, shown in FIG. 1. Here, FIG. 4 is a flow chart for explaining operations of the magneto-optical disk apparatus 1 when the storage medium is mounted on the drive mechanism unit. FIG. 5 is a flow chart for explaining operations of this magneto-optical disk apparatus 1 when the access operation is prohibited. FIG. 6 is a flow chart illustrating operations of this magneto-optical disk apparatus 1 when the use of the storage medium is ended. FIG. 7 is a flow chart for explaining operations of this magneto-optical disk apparatus 1 when a large value is set to the use number of times limit information (counter).

(First Use Mode of Storage Medium)

In the magneto-optical disk apparatus 1 of the data processing apparatus which may realize a first use mode of the storage medium, such a magneto-optical disk 2 is used. This disk 2 may be replaced under detachable condition, and further is rewritable. The magneto-optical disk 2 owns the user data storage region 20. The magneto-optical disk apparatus 1 can control recording (storing) of data on this user data storage region 20, or can control reproducing (alternatively, writing, or reading) of data into this user data storage region 20 in response to the normal command sent from the host computer 3, namely the read/write command which is supported by the operating system (OS) of the host computer 3.

Also, the magneto-optical disk 2 owns the access control data storage region 21. The magneto-optical disk apparatus 1 can control recording of data on this access control data storage region 21, or can control reproducing of data from this access control data storage region 21 in response to the specific command transmitted from the host computer 3, namely the command which is produced by the use permission manager and also is not supported by the OS of the host computer 3. In this access control data storage region 21, one set of the use permission discrimination information 210 and the use allowed/not-allowed state information (flag) 221 functioning as the use limit information 220 are stored in correspondence to each other.

It should also be noted that a command which is not supported by an operating system (OS) of a host computer owns the following implication. That is, the normal read command and the normal write command are carried out via the OS. However, in order to effectively use a storage apparatus equipped with an access limit function (in this example, a magneto-optical disk apparatus), application software which is exclusively used to this storage apparatus is previously installed in a host computer.

This application software corresponds to such a command supplied to the magneto-optical disk apparatus so as to execute a read control and a write control with respect to a magneto-optical disk as follows: that is, this application software may display on a computer display the following messages: "enter password and a number of times used", and "this password does not coincide with correct password, storage medium is not allowed to be used." Also, this application software sends the entered password and the entered number of times used to the magneto-optical disk apparatus so as to instruct a control unit of a drive for controlling data read/write operations. In general, this known control unit is an MPU (main processor unit), or an ODC (optical disk controller), or a DSP (digital signal processor).

In the magneto-optical disk 2 used in this embodiment, the use permission discrimination information 210 is set by the use permission manager, and it is a password capable of avoiding unauthorized accesses to user data stored in the user data storage region 20. Also, the use allowed/not-allowed state information 221 indicates the access allow state and the access not-allow state to the user data storage region 20, and employs the binary data of "1" and the binary data of "0" so as to correspond to these two states.

The following setting operation of this use allowed/not-allowed state information 221 may constitute the important aspect. That is, in the case that a user who knows a password, namely the use permission manager finishes the use of storage medium and then takes out the magneto-optical disk 2 from the magneto-optical disk apparatus 1, the use allowed/not-allowed state information 221 is forcibly set to the access not-allow state of "0." As a result, when the magneto-optical disk 2 is mounted (inserted) into the magneto-optical disk apparatus 1, the use allowed/not-allowed state information 221 is continuously set to an initial value, namely the access not-allow state of "0." The use allowed/not-allowed state information 221 is rewritten into the access allow state of "1" in the case that such a password which is inputted from the host computer 3 by the use permission manager who knows this password which is the use permission discrimination information 210 of the magneto-optical disk 2 is transmitted to the magneto-optical disk apparatus 1, and then this transmitted password is collated with another password which is stored in the magneto-optical disk 2, and thereafter, the transmitted password coincides with the stored password.

Subsequently, an access control operation will now be explained more in detail in the case that the magneto-optical disk 2 is mounted on the magneto-optical disk apparatus 1, while the access control data storage region 21 of this magneto-optical disk 2 saves both the use permission discrimination information (password) 210 capable of allowing the access to the user data storage region 20, and the use allowed/not-allowed state information (flag) 221, and further, this use allowed/not-allowed state information 221 is set to the use not-allow state of "0."

It should also be noted that various sorts of the below-mentioned access control operations are executed by controlling operations of the respective constructive units under control by the software stored in the control unit 17.

The control unit 17 provided in the magneto-optical disk apparatus 1 senses that the magneto-optical disk (storage medium) 2 is installed to the drive mechanism unit 10, so that the control unit 17 executes the normal medium load process operation (steps S40, S41, S42 of flow chart shown in FIG. 4). The medium load operation implies such an operation that the position of the optical head 11 is moved just under the medium 2, and the optical focal point of the optical head 11 is focused onto the medium 2, so that the data recorded on the medium 2 can be reproduced, and also the data can be recorded on the medium 2.

In a final stage of the medium load processing operation, the control unit 17 controls both the optical head 11 and the read mechanism unit 13 to access the access control data storage region 21 of the medium 2 (step S43).

Since the control unit 17 accesses this access control data storage region 21, it can be seen that the password 210 and the use allowed/not-allowed state information 221 (otherwise use number of times limit information 222) are present in the storage medium 2. The control unit 17 reads both the password 210 and the use allowed/not-allowed state information 221 of the storage medium 2 into the buffer memory unit 14 via the read mechanism unit 13 (step S44).

Based upon such a fact that the data is equal to "0" and this data corresponds to the password 210 of the access control data storage region 21 stored in the buffer memory unit 14, the control unit 17 detects that the use limit information 220 is the use allowed/not-allowed state information 221 and indicates the use not-allowed state of "0" (step S45), and the access operation from the host computer 3 to the user data storage region 20 of the medium 2 is prohibited by the host interface unit 16 (step S46).

Under this access prohibit condition, even when either the normal read command or the normal write command is issued from the host computer 3 via the host interface unit 16 to the user data storage region 20, the control unit 17 notifies the denied access to the host computer 3 (steps S50 and S51 of FIG. 5).

Under the above-explained access prohibit condition, when the password is sent from the host computer 3 through the specific command (step S52), this password is stored via the host interface unit 16 into the buffer memory unit 14. The collating unit 15 collates the transmitted password with the password 210 which has been stored in the buffer memory unit 14 and is read out from the medium 2.

In the case that the control unit 17 detects the coincidence of the passwords in the collating unit 15 (step S53), the control unit 17 sets the use allowed/not-allowed state information 221 corresponding to the password 210 of the access control data storage region 21 to such data of "1" indicative of the use allow state via both the write mechanism unit 12 of the drive mechanism unit 10 and the optical head 11 (step S54).

With execution of this process operation, a subsequent access to the storage medium 2 is allowed by the control unit 17 (step S55). In this first storage medium use mode, the control unit 17 judges at the next process sequence step S56 that the data of the use number of times limit information (counter) 222 is not changed. As a consequence, in response to the normal command transmitted from the host computer 3, either the read access operation or the write access operation with respect to the user data storage region 20 of the medium 2 can be performed (step S57).

Under this access executable condition, in the case that the use permission manager performs a desirable access operation from the host computer 3 by using the medium 2 and then finishes the process operation, a process end command is issued from the host computer 3 to the control unit 17.

As a result, the control unit 17 sets the use allowed/not-allowed state information 221 of the access control data storage region 21 to the data of "0" indicative of the use not-allow state, and then ejects the storage medium 2 from the drive mechanism unit 10 (steps S60, S61, S62 of FIG. 6). It should be understood that in the above-described step S60, specifically, the control unit 17 reads the data value of the use limit information 220 corresponding to the password 210, and when the read data value of this use limit information 220 is equal to "1", the control unit 17 executes such a process operation capable of forcibly setting the data value of "1" to "0."

Subsequently, the storage medium 2 is not allowed to be used unless such a password which coincides with the above-described password 210 is again transmitted from the host computer 3.

Since the above-explained access control sequential operation is employed, any operators other than the user who knows the password 210 of the magneto-optical disk 2, namely, any persons other than the use permission manager cannot access this storage medium. As a consequence, such information which is not wanted to be disclosed to any persons other than the true user can be stored into this storage medium.

(Second Use Mode of Storage Medium)

In the magneto-optical disk apparatus 1 of the data processing apparatus which may realize a second storage medium use mode, such a magneto-optical disk 2 is used. This disk 2 may be replaced under detachable condition, and further is rewritable. The magneto-optical disk 2 owns the user storage region 20 where the magneto-optical disk apparatus 1 can control to record data on this user data storage region 20, or can control to reproduce data from this user data storage region 20 in response to the normal command sent from the host computer 3.

Also, the magneto-optical disk 2 owns the access control data storage region 21. The magneto-optical disk apparatus 1 can control to record data on this access control data storage region 21, or can control to reproduce data from this access control data storage region 21 in response to the above-described specific command (namely, command produced by use permission manager) transmitted from the host computer 3. In this access control data storage region 21, one set of the use permission discrimination information 210 and the use number of times limit information (counter) 222 functioning as the use limit information 220 are stored so as to correspond to each other.

In the magneto-optical disk 2 used in this embodiment, the use permission discrimination information 210 is set by the use permission manager, and corresponds to such a password capable of avoiding unauthorized accesses to user data stored in the user data storage region 20. Also, the use number of times limit information 222 indicates the accessible number of times to the user data storage region 20, and employs such multi-value data having values larger than, or equal to "0."

Also, similar to the first storage medium use mode, in the case that a user who knows a password, namely the use permission manager finishes the use of storage medium and then takes out the magneto-optical disk 2 from the magneto-optical disk apparatus 1, the use allowed/not-allowed state information 221 is forcibly set to the access not-allow state of "0." As a result, when the magneto-optical disk 2 is mounted into the magneto-optical disk apparatus 1, the use allowed/not-allowed state information 221 is continuously set to an initial value, namely the access not-allow state of "0." The use allowed/not-allowed state information 221 is rewritten into the access allow state of "1" in the case that such a password which is inputted from the host computer 3 by the use permission manager who knows this password equal to the use permission discrimination information 210 of the magneto-optical disk 2 is transmitted to the magneto-optical disk apparatus 1, and then this transmitted password is collated with another password which is stored in the magneto-optical disk 2, and thereafter, the transmitted password coincides with the stored password.

Subsequently, an access control operation will now be explained more in detail in the case that the magneto-optical disk 2 is mounted on the magneto-optical disk apparatus 1, while the access control data storage region 21 of this magneto-optical disk 2 saves both the use permission discrimination information (password) 210 capable of allowing the access to the user data storage region 20, and the use allowed/not-allowed state information (flag) 221, and further, this use allowed/not-allowed state information 221 is set to the use not-allow state of "0." Thereafter, this use allowed/not-allowed state information 221 is set to the use allow state of "1", and then the use permission manager who know the password 210 sets the numeric value of the use number of times limit information (counter) 222. As a result, a third party (general user) is allowed to use the magneto-optical disk only for a number of times defined by this set value without entering the password.

The control unit 17 provided in the magneto-optical disk apparatus 1 senses that the magneto-optical disk (storage medium) 2 is installed to the drive mechanism unit 10, so that the control unit 17 executes the normal medium load process operation (steps S40, S41, S42 of flow chart shown in FIG. 4).

In a final stage of the medium load processing operation, the control unit 17 controls both the optical head 11 and the read mechanism unit 13 to access the access control data storage region 21 of the medium 2 (step S43).

Since the control unit 17 accesses this access control data storage region 21, it can be seen that the password 210 and either the use allowed/not-allowed state information 221 or the use number of times limit information 222 are present in the storage medium 2. The control unit 17 reads both the password 210 of the medium 2 and either the use allowed/not-allowed state information 221 or the use number of times limit information 222 of the storage medium 2 into the buffer memory unit 14 via the read mechanism unit 13 (step S44).

Based upon such a fact that the data is equal to "0" and this data corresponds to the password 210 of the access control data storage region 21 stored in the buffer memory unit 14, the control unit 17 detects that the use limit information 220 is the use allowed/not-allowed state information 221 and indicates the use not-allowed state of "0" (step S45), and the access operation from the host computer 3 to the user data storage region 20 of the medium 2 is prohibited by the host interface unit 16 (step S46).

Under this access prohibit condition, even when either the normal read command or the normal write command is issued from the host computer 3 via the host interface unit 16 to the user data storage region 20, the control unit 17 notifies the denied access to the host computer 3 (steps S50 and S51 of FIG. 5).

Under the above-explained access prohibit condition, when the password is sent from the host computer 3 through the specific command (step S52), this password is stored via the host interface unit 16 into the buffer memory unit 14. The collating unit 15 collates the transmitted password with the password 210 which has been stored in the buffer memory unit 14 and is read out from the medium 2.

In the case that the control unit 17 detects the coincidence of the passwords in the collating unit 15 (step S53), the control unit 17 sets the use allowed/not-allowed state information 221 corresponding to the password 210 of the access control data storage region 21 to such data of "1" indicative of the use allow state via both the write mechanism unit 12 of the drive mechanism unit 10 and the optical head 11 (step S54). With execution of this process operation, a subsequent access to the storage medium 2 is allowed by the control unit 17 (step S55).

In this second storage use mode, subsequently, in order that the use permission manager who knows the password 210 sets a numeric value of the use number of times limit information 222, an arbitrary number (for example, "10") larger than "0" is transmitted from the host computer 3 through the specific command to the host interface unit 16. Since the control unit 17 judges at the next process sequence step S56 that the data of the use number of times limit information 222 is changed, the set numeric value "10" of the use number of times limit information 222, which is stored in the buffer memory unit 14, is supplied via both the write mechanism unit 12 and the optical head 11 to the access control data storage region 21 of the storage medium 2 so as to be recorded thereon as the use number of times limit information 222 (step S58).

Thereafter, when the use permission manager finishes the process operation, a process end command is transmitted from the host computer 3 to the control unit 17. As a result, the control unit 17 reads out the numeric value "10" of the use number of times limit information 222 of the access control data storage region 21, and then, stores this read numeric value "10" into the buffer memory unit 14 via the optical head 11 and the read mechanism unit 13. Thus, the control unit 17 records a numeric value of "9" obtained by subtracting "1" from the above-explained numeric value of "10" in the access control data storage region 21 as the use time number limit information 222 via both the write mechanism unit 12 and the optical head 11, and also ejects the medium 2 from the drive mechanism unit 10 (steps S60, S61, S63 of FIG. 6). In the above-described step S60, the control unit 17 reads the data value of the use limit information 220, which corresponds to the password 210. When this read data value is equal to any data value other than "1", the control unit 17 executes such a process operation that such a numeric value obtained by subtracting "1" is set.

In the case that the medium 2 is again loaded on the drive mechanism unit 10, the control unit 17 reads out data (numeric value) of the use number of times limit information 222 stored in the access control data storage region 21 via the buffer memory unit 14, and then detects that any value other than "0" (in this case, "9") is stored. Subsequently, the control unit 17 allows to access this reloaded storage medium 2 without executing the password collation. In other words, even such a general user who does not know the password can access this storage medium 2, while a total number of times of use of this storage medium 2 is limited within a range of the set number of times (steps S40, . . . , S45 and S47 of flow chart shown in FIG. 4).

In the case that the process operation is completed after the user has used the storage medium 2, a process end command is transmitted from the host computer 3 to the control unit 17. As a result, the control unit 17 reads out the numeric value "10" of the use number of times limit information 222 of the access control date storage region 21, and then, stores this read numeric value "10" into the buffer memory unit 14 via the optical head 11 and the read mechanism unit 13. Thus, the control unit 17 records a numeric value of, for example, "8" obtained by subtracting "1" from the above-explained numeric value of "9" in the access control data storage region 21 as the use time number limit information 222 via both the write mechanism unit 12 and the optical head 11, and also ejects the medium 2 from the drive mechanism unit 10 (steps S60, S61, S63 of FIG. 6).

Since the above-described access control sequence is employed, such a general user who does not know the password may access the storage medium 2 as many times as "set number of times −1" which is set by the use permission manager who knows this password as the use number of times limit information 222 into the access control data storage region 21.

Utilizing this access control function, limitation can be put to a usable number of times of the storage medium 2 on which specific information (for example, copyright information such as music and movies) has been recorded. Concretely speaking, KARAOKE music data may be marketed as such a storage medium 2 which is allowed to be played 10 times.

Also, in the case that a set numeric value of the use number of times limit information 222 is set to a practically extremely large value (namely, set limit value), substantially, the general users who do not know the password of the storage medium 2 may access this storage medium 2 infinitely. This setting example may have an advantage in that when the storage medium 2 corresponds to a copyright product, this copyright product is freely used by a third party by abandoning this copyright.

Normally, the above-explained set limit value may be defined in a user manual. For instance, if the set limit value is set to 0.1 million times in the user manual, then the use permission manager never sets any value larger than, or equal to 0.1 million times. Even when the use permission manager does not set the number of times, the control unit 17 may enter the set limit value into the disk 2 in response to such a command that the total number of times used is selected to be infinite.

(Third Use Mode of Storage Medium)

A description will now be made of an access control method capable of changing a password functioning as the use permission discrimination information 210 which is set in the access control data storage region 21 of the medium 2 in a third storage medium use mode. It should be understood that items described in this third storage medium use mode different from those of the above-explained first and second storage medium use modes will be explained more in detail, but the same contents of the items are not explained, or are simply described.

In accordance with a first method capable of changing a password, in the case that such a password (namely password P31) which has been set to the access control data storage region 21 of the medium 2 is changed, the use permission manager sets the use number of times limit information (CT31) 222 as the use limit information 220 to a practically very large value by using once the old password (namely password P31) so as to bring once the medium 2 into such a condition that this medium 2 can be used without any use limitation.

Thereafter, the use permission manager sets both a new password (namely password P32) and new use number of times limit information (namely CT32) 222 corresponding to this new password P32 into the access control data storage region 21. Then, when the new use number of times limit information (CT32) 222 is once set, this data (numeric value) is used as a top priority, so that the password can be changed.

In this first method, as to a set of the present password P1 and the use number of times limit information (CT31) 222, the value of the use number of times limit information (CT31) 222 is brought into such a condition that this value is set to a large value. Essentially, this condition is identical to such a condition that anyone can access the storage medium 2 without entering a password. At this time, a set of the new password P32 and the use number of times limit information (CT32) 222 can be set. In other words, in the case that the storage medium 2 can be freely accessed, a password can be newly set.

In accordance with a second method capable of changing a password, in the case that such a password (namely password P31) which has been set to the access control data storage region 21 of the medium 2 is changed, the use permission manager sets the use number of times limit information (CT31) 222 as the use limit information 220 to a numeric value of "0" by using once the old password (namely password P31), and then so as to invalidate the old password (P31).

Thereafter, the use permission manager sets both a new password (namely password P32) and new use number of times limit information (namely CT32) 222 of the numeric value "1" corresponding to this new password P32 into the access control data storage region 21, so that the new password (P32) is validated.

In contrast to the first password changing method, in this second password changing method, the user who knows the password, namely only the use permission manager invalidates the present password P31, and can newly change setting of the password P32.

Specifically, in the case that any user is capable of accessing the storage medium 2, the use permission manager transmits a set of the new password P32 and the new use number of times limit information (CT32) 222 from the host computer 3 to the host interface unit 16, and additionally sets this password/limit information set via the buffer memory unit 14, the write mechanism 12, and the optical head 11 to the access control data storage region 21 of the medium 2.

Thereafter, in the case that the process operation is ended by using the medium 2 in the host computer 3, a process end command is transmitted from the host computer 3 to the host interface unit 16. As a result, the control unit 17 returns the numeric value of the use number of times limit information (CT31) 222 of the access control data storage region 21 to "0". As a result, the medium 2 is brought into the use not-allow condition.

In the case that the storage medium 2 where both the new password P2 and the old password P1 are present is again loaded, the control unit 17 reads out the new use number of times limit information (CT32) 222 stored in the access control data storage region 21, and then performs a different operation control in accordance with the content (numeric value) of this new use number of times limit information.

In other words, when the content of the new use number of times limit information (CT32) 222 is equal to "0", the access to the storage medium 2 is prohibited. Then, this storage medium 2 is brought into the access prohibit condition until the new password 32 is transmitted from the host computer 2. On the other hand, in the case that the content of the new use number of times limit information (CT32) 222 is such a numeric value larger than "0", the access to the storage medium 2 is allowed as many times as a number set to the new use number of times limit information (CT32) 222 irrespective of the provision of the new password P32.

(Fourth Use Mode of Storage Medium)

A fourth storage medium use mode which will be subsequently explained corresponds to such an access control method for extending the above-explained first storage medium use mode. In this fourth storage medium use mode, while plural sets of the use permission discrimination information (password) 210 and the use allowed/not-allowed state information (flag) 221 as the use limit information 220 are set into the access control data storage region 21 of the medium 2, various sorts of access control operations may be carried out.

It should be understood that items described in this fourth storage medium use mode which are different from those of the above-explained first storage medium use mode will be explained more in detail, but the same contents of the items are not explained, or are simply described. Each of process sequence operations according to this fourth storage medium use mode is basically carried out in accordance with those shown in FIG. 4, FIG. 5, and FIG. 6. It should be noted that a judgement made at a step S53 as to whether or not a coincident password and a sort of an access command (instruction) match is required at a step subsequent to, for instance, a step S53 in this fourth storage medium use mode. When the coincident password and the sort of the access command do not match, an access to the disk 2 is denied.

In a first access control method according to the fourth storage medium use mode, a set of a flag F41 and a password P41 readable/writable with respect to the storage medium 2, and also another set of a flag F42 and a password P42 readable with respect to the medium 2 are set to the access control data storage region 21.

Then, in the case that the readable/writable password P41 is transmitted from the host computer 3 to the magneto-optical disk apparatus 1, since the content of the flag F41 corresponding to this password P41 is set to "1", either read access or write access is available with respect to the user data storage region 20 of the medium 2.

Also, in the case that the readable password 42 is transmitted from the host computer 3, the flag F42 corresponding to this password P42 is set to "1", and the read access is available with respect to the user data storage region 20 of the medium 2.

This first access control method may become effective with respect to such information which can be classified into a user who owns a right capable of changing the storage content of the storage medium 2, another user who can work by merely referring to the storage content of the storage medium 2, and a third party by which the storage content is not wanted to be observed.

Concretely speaking, a patient's case record at a hospital corresponds to this information. Apparently, a doctor knows a read/write password to execute date writing/changing operation, since the doctor must write/change the data. Since a nurse and a pharmacist must observe the content of this storage medium in order to follow an instruction, the nurse and the pharmacist should observe this storage content by using the read password. Since this content is not wanted to be observed by other persons, they do not know the password and therefore cannot completely access the storage content.

In a second access control method of the fourth storage medium use mode, a set of a readable password P43 and a flag F43 is set into the access control data storage region 21 only in a specific area of the user data storage region 20 in the medium 2.

Then, in the case that the readable password P43 is transmitted from the host computer 3 to the magneto-optical disk apparatus 1, since the content of the flag F43 corresponding to this password P43 is set to "1", the read access operation is available with respect to a specific area of the user data storage region 20. In this case, a file list of the storage medium 2 may be set in the specific area.

This second access control method constitutes such an effective function when a portion of the storage content of the medium 2 is wanted to be publicized. Concrete example of which is a charged KARAOKE music collection. In this system, a customer may use only specific data (tune) based upon desired tune and an amount of money by using this second access control method.

Also, this second access control method corresponds to such an effective function capable of desirably opening a content list of the medium 2. In the above-explained KARAOKE music collection, when a customer wishes to grasp what types of music are involved in this KARAOKE music collection, only a list of KARAOKE music titles is allowed to be publicized.

In a third access control method according to the fourth storage medium use mode, a set of a flag F44 and a password P44 readable/writable with respect to only a specific file of the storage medium 2, and also another set of a flag F45 and a password P45 readable with respect to only the specific file of the medium 2 are set to the access control data storage region 21.

Then, in the case that the readable/writable password P44 is transmitted from the host computer 3 to the magneto-optical disk apparatus 1, since the content of the flag F44 corresponding to this password P44 is set to "1", the read/write access operation is available with respect to only the specific file of the user data storage region 20 of the medium 2.

Also, in the case that the readable password P45 is transmitted from the host computer 3, the flag F45 corresponding to this password P45 is set to "1", and the read access operation is available with respect only to the specific file of the user data storage region 20 of the medium 2.

(Fifth Use Mode of Storage Medium)

A fifth storage medium use mode which will be subsequently explained corresponds to such an access control method for extending the above-explained second and fourth storage medium use modes. In this fifth storage medium use mode, while plural sets of the use permission discrimination information (password) 210 and the use number of times limit information (counter) 222 as the use limit information 220 are set into the access control data storage region 21 of the medium 2, various sorts of access control operations may be carried out.

It should be understood that items described in this fifth storage medium use mode different from those of the above-explained second and fourth storage medium use modes will be explained more in detail, but the same content of the items are not explained, or are simply described.

In the fifth storage medium use mode, when the value of the counter functioning as the use number of times limit information 222 is set to, for example, 100,000 times, even if the user does not enter the password 100,000 times, then this user may freely use the storage medium 2. When this counter value is set to such a practically extremely large value, the storage medium 2 may be used with substantially no limit in the actual case.

In a first access control method according to the fifth storage medium use mode, both a set of readable/writable password P51 with respect to the storage medium 2 and a counter value CT51, and also another set of a readable password P52 with respect to the medium 2 and another counter value CT52 are set to the access control data storage region 21.

Then, in the case that the readable/writable password P51 is sent from the host computer 3 to the magneto-optical disk apparatus 1, since the content of the counter CT51 corresponding to this password P51 is set to "100,000,000", either the read access or the write access to the user data storage region 20 of the medium 2 is available.

Also, in the case that the readable password P52 is transmitted from the host computer 3, the value of the counter CT52 corresponding to this password P52 is set to "100,000,000", so that the read access to the user data storage region 20 of the medium 2 is available.

In a second access control method according to the fifth storage medium use mode, a set of a counter CT53 and a readable password P53 only to a specific area of the user data storage region 20 in the storage medium 2 is set to the access control data storage region 21.

Then, in the case that the readable password P53 is sent from the host computer 3 to the magneto-optical disk apparatus 1, since the content of the counter CT53 corresponding to this password P53 is set to "100,000,000", the read access to the specific area of the user data storage region 20 of the medium 2 is available. In this case, a file list of the medium 2 may be set to the specific area.

In a third access control method according to the fifth storage medium use mode, both a set of readable/writable password P54 with respect only to a specific file of the storage medium 2 and a counter value CT54, and also another set of a readable password P55 with respect only to a specific file of the medium 2 and another counter value CT55 are set to the access control data storage region 21.

Then, in the case that the readable/writable password P54 is sent from the host computer 3 to the magneto-optical disk apparatus 1, since the content of the counter CT54 corresponding to this password P54 is set to "100,000,000", both the read access and the write access only to the specific file of the user data storage region 20 of the medium 2 is available.

Also, in the case that the readable password P55 is transmitted from the host computer 3, the value of the counter CT55 corresponding to this password P55 is set to "100,000,000", so that the read access only to the specific file of the user data storage region 20 of the medium 2 is available.

FIG. 7 shows a process sequential operation (steps S70, . . . , S76) of the respective first to third access control methods according to the fifth storage medium use modes. Similar to the process operations executed in the fourth storage medium use mode, detailed process sequential operations of the respective access control methods according to the fifth storage medium use mode are performed in accordance with the process sequential operations shown in FIG. 4, FIG. 5, and FIG. 6.

Now, the following description indicates combination examples of the respective counters and features thereof:
(1). Read/Write counter—100,000,000 times.
Read counter—zero times.
In the actual case, this storage medium 2 can be read/write-accessed by indefinite users infinite times.
(2). Read/Write counter—zero times.
Read counter—100,000,000 times.
In the actual case, this storage medium 2 can be read-accessed by indefinite users infinite times.
(3). Read/Write counter—zero times.
Read counter—zero times.
Specific file counter—100,000,000 times.
In the actual case, the specific file of this storage medium 2 can be used by indefinite users infinite times.

As a concrete example of the above-explained fifth storage medium use mode, a description will now be made of a distribution of KARAOKE music information:
(1). The storage medium 2 with the below-mentioned condition is distributed to indefinite users.
Read/Write counter—zero times.
Read counter—zero times.
File list counter—100,000,000 times.
Specific file counter—zero times.
Under this condition, although indefinite users may observe the file list (KARAOKE music titles), indefinite users cannot use that tune.
(2). When a specific user paid a portion of use fees, the storage medium 2 is set to the below-mentioned condition:
Read/Write counter—zero times.
Read counter—zero times.
File list counter—100,000,000 times.
Specific file counter—100,000,000 times.
Under this condition, the specific user can observe the file list (KARAOKE music titles), and further can use the specific tune.
(3). When a specific user paid such a use fee by which the entire storage medium can be used, this storage medium 2 is set to the condition described below:
Read/Write counter—zero times.
Read counter—100,000,000 times.
File list counter—100,000,000 times.
Specific file counter—zero times.
Under this condition, the specific user can observe the file list (KARAOKE music titles), and further can use all the tunes.

(4). In the case of a music manager,
  Read/Write counter—100,000,000 times.
  Read counter—zero times.
  File list counter—zero times.
  Specific file counter—zero times.
  Under this condition, the music manager can rewrite and read all of the tunes.

[Various Modifications]

In according with the present invention, various modifications may be conceived. For instance, when the magneto-optical disk (storage medium) 2 is inserted into the magneto-optical disk apparatus 1 and then a first access operation is performed, both the password read out from this storage medium 2 and the use limit information such as the number of times used are stored into the buffer (buffer memory unit 14) to collate the passwords with each other. As a result, when the subsequent access operations are carried out, the read/write commands issued from the host computer may be controlled to be allowed by merely referring to the buffer memory unit 14 without accessing the magneto-optical disk 2.

Thereafter, when the password and the use limit information such as the number of times used are changed, the information registered in the buffer memory unit is rewritten for the time being. While the storage medium is being inserted, when the password collation is carried out, the control unit refers to the information registered in the buffer memory unit. If only the password is to be changed, the information may be immediately rewritten into the medium in response to the change command. However, the number of times used must be rewritten since the commands are received many times, so that the access process speed is lowered. Alternatively, the information saved only on the buffer may be rewritten in advance, and the information may be written on the magneto-optical disk 2 during a spare time free of command process, when the medium is ejected, and when the power supply is cut off.

As a consequence, in the storage apparatus of the present invention, "rewriting of information" implies both rewriting operations such that the information is rewritten in a buffer (namely temporary storage memory employed in storage apparatus), and also the information is rewritten on a magneto-optical disk (namely, storage medium).

Also, since such information as "allow" as a collation result of passwords is registered into the buffer, this registered information may be checked every time access operation is performed. As a result, a password need not be entered every time access operation is carried out. It should be noted that when a number of times used which is related to an access operation is present, the storage content of the buffer must be checked every time access operation is carried out.

In the above-described embodiment, the access control method has been carried out based upon the number of times (use limit number of times information). Alternatively, the access control method maybe performed based upon a time period (time duration, day, etc.).

Also, as another collation method made by not entering a password owned by a use permission manager, when a storage medium is formatted by using a password (system ID) which has been previously registered in either a storage apparatus (either drive manufacturing number or drive ID) or a host computer (superior control apparatus), if this password is registered, and then this storage medium is used by neither the same storage apparatus, nor the same host computer, the passwords do not coincide with each other. As a consequence, unauthorized use of this storage medium can be suppressed.

In the above-explained embodiment, only the passwords are used as the use permission discrimination information. As indicated in FIG. 3, both the use permission discrimination information 210 and the use limit information 220 may be linked in relation to the use permission region 230.

In other words, a password "0001" may be used to read/write an entire storage region, another password "0002" may be used to read only a file list of the storage region, and, of course, a set of an identifier (allow state information) and a password, by which the entire storage region can be read/written, may be stored, while no judgement is made by using only the passwords.

In the above-explained embodiment, the magneto-optical disk 2 is employed as the storage medium. However, other storage media may be similarly employed as this storage medium. That is, this magneto-optical disk 2 may be replaced by such storage media as an optical disk, a magnetic disk, a floppy disk, a memory card, and a magnetic tape. When these alternative storage media is realized, while a portion of a data region (user region) of a storage medium popularized in the market is changed into a second region, this second region is set in such a manner that this second region cannot be accessed by using the normal command.

Alternatively, the storage apparatus may be realized not only by a magneto-optical disk apparatus, but also an optical disk apparatus, a magnetic disk apparatus, and the like, depending upon the type of a storage medium.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. A storage apparatus capable of using a storage medium having at least a first region for storing therein data and a second region for storing therein both use permission discrimination information indicative of permission of a predetermined access operation and use limit information with respect to said storage medium, comprising:

a reading unit for reading said use limit information from said second region of said storage medium prior to an access to said storage medium;

a collating unit for collating use permission discrimination information provided for a comparison purpose with said use permission discrimination information read out from said second region of said storage medium in the case that said use limit information indicates an access not-allowed condition; and a writing unit for rewriting said use limit information on said second region into such information indicative of an access allowed condition when it is confirmed by the collation that the former use permission discrimination information coincides with the latter use permission discrimination information read out from the second region.

2. A storage apparatus as claimed in claim 1, wherein:
   said writing unit rewrites said use limit information into such information indicative of an access not-allowed condition when the use of said storage medium is ended.

3. A storage apparatus as claimed in claim 1, wherein:
   said use limit information is information used to define the number of times used.

4. A storage apparatus as claimed in claim 1, wherein:
in the case that said use limit information indicates an access allowed condition, said storage apparatus permits a predetermined access to said storage medium.

5. A storage apparatus as claimed in claim 1, wherein:
said use permission discrimination information contains such information for discriminating at least one of access allowed conditions of recording and reproducing operations with respect to a predetermined region of said first region.

6. A storage apparatus as claimed in claim 1, wherein further comprising:
an access control unit for permitting an access operation based upon said use permission discrimination information and said use limit information, which correspond to an access instruction of said storage medium in the case that plural sets of said use permission discrimination information and said use limit information are set to said second region.

7. A storage apparatus as claimed in claim 1, wherein said use limit information comprises at least one of a flag indicating use allowed/not allowed state information and a counter indicating use number of times limit information.

8. A storage apparatus capable of using a storage medium having at least a first region for storing therein data, and a second region for storing therein use permission discrimination information used to permit an access operation, comprising:
a reading unit for reading said use permission discrimination information from said second region of said storage medium;
a collating unit for collating use permission discrimination information provided for a comparison purpose with said use permission discrimination information read from said second region; and
a rewrite control unit for allowing to rewrite use limit number information recorded on said second region so as to correspond to said use permission discrimination information when it is confirmed by the collation that the former use permission discrimination information coincides with the latter use permission discrimination information read out from the second region, said use limit number information being used to limit the access to said storage medium.

9. A storage apparatus as claimed in claim 8, wherein:
when said use limit number information is invalidated, said rewrite control unit performs such a control that said use limit number information is rewritten into a practically very large value.

10. A storage apparatus as claimed in claim 8, wherein:
said use permission discrimination information contains such information for discriminating at least one of access allowed conditions of recording and reproducing operations with respect to a predetermined region of said first region.

11. A storage apparatus as claimed in claim 8, further comprising:
an access control unit for permitting an access operation based upon said use permission discrimination information and said use limit number information, which correspond to an access instruction of said storage medium in the case that plural sets of said use permission discrimination information and said use limit number information are set to said second region.

12. A storage apparatus as claimed in claim 8, wherein said use limit number information comprises a counter.

13. An access control method applicable to such a storage apparatus capable of using a storage medium having at least a first region for storing therein data and a second region for storing therein both use permission discrimination information indicative of permission of a predetermined access operation and use limit information with respect to said storage medium, said method comprising the steps of:
reading said use limit information from said second region of said storage medium prior to an access operation with respect to said storage medium;
collating use permission discrimination information provided for a comparison purpose with said use permission discrimination information read out from said second region of said storage medium in the case that said use limit information indicates an access not-allowed condition; and
rewriting said use limit information on said second region into such information indicative of an access allowed condition when it is confirmed by the collation that the former use permission discrimination information coincides with the latter use permission discrimination information read out from the second region.

14. An access control method as claimed in claim 13, further comprising:
a step of permitting an access operation based upon said use permission discrimination information and said use limit information, which correspond to an access instruction of said storage medium in the case that plural sets of said use permission discrimination information and said use limit information are set to said second region.

15. An access control method as claimed in claim 13, wherein said use limit information comprises at least one of a flag indicating use allowed/not allowed state information and a counter indicating use number of times limit information.

16. An access control method applicable to such a storage apparatus capable of using a storage medium having at least a first region for storing therein data, and a second region for storing therein use permission discrimination information used to permit an access operation, said method comprising the steps of:
reading said use permission discrimination information from said second region of said storage medium;
collating use permission discrimination information provided for a comparison purpose with said use permission discrimination information read from said second region; and
allowing to rewrite use limit number information recorded on said second region so as to correspond to said use permission discrimination information when it is confirmed by the collation that the former use permission discrimination information coincides with the latter use permission discrimination information read out from the second region, said use limit number information being used to limit the access to said storage medium.

17. An access control method as claimed in claim 16, further comprising:
a step of permitting an access operation based upon said use permission discrimination information and said use limit number information, which correspond to an access instruction of said storage medium in the case that plural sets of said use permission discrimination information and said use limit number information are set to said second region.

18. An access control method as claimed in claim 16, wherein said use limit information comprises a counter.

* * * * *